(12) United States Patent
Wu

(10) Patent No.: US 7,513,047 B2
(45) Date of Patent: Apr. 7, 2009

(54) HANDHELD POWER TOOL WITH A DETACHABLE HANDLE

(75) Inventor: Shuming Wu, Nanjing (CN)

(73) Assignee: Nanjing Chervon Industry Co. Ltd., Nanjing P.R. (CN)

( * ) Notice: Subject to any disclaimer, the term of this patent is extended or adjusted under 35 U.S.C. 154(b) by 455 days.

(21) Appl. No.: 11/004,334

(22) Filed: Dec. 3, 2004

(65) Prior Publication Data

US 2005/0262707 A1    Dec. 1, 2005

(30) Foreign Application Priority Data

Jun. 1, 2004    (CN) .................... 2004 2 0027477 U

(51) Int. Cl.
*B27B 19/02*    (2006.01)
*B27B 19/09*    (2006.01)
*B25F 5/02*    (2006.01)

(52) U.S. Cl. .................. 30/392; 30/517; 200/50.36; 200/331

(58) Field of Classification Search ............... 30/296.1, 30/371, 374, 392, 393, 394, 517; 173/170, 173/171, 29; 409/182; 16/422; 144/48.5, 144/136.95, 154.5; 200/50.33, 50.35, 50.36, 200/331

See application file for complete search history.

(56) References Cited

U.S. PATENT DOCUMENTS

| 1,502,169 | A | * | 7/1924 | Bennett .................. 173/217 |
| 2,263,136 | A | * | 11/1941 | Knouse et al. .......... 30/374 |
| 3,952,239 | A | * | 4/1976 | Owings et al. .......... 320/113 |
| 3,973,179 | A | * | 8/1976 | Weber et al. ............ 320/113 |
| 4,021,914 | A |   | 5/1977 | Leibundgut et al. |
| 4,050,003 | A | * | 9/1977 | Owings et al. .......... 320/113 |
| 4,381,037 | A | * | 4/1983 | Cuneo .................... 173/170 |
| 4,628,605 | A | * | 12/1986 | Clowers ................. 30/393 |
| 4,675,944 | A | * | 6/1987 | Wells .................... 452/164 |
| 4,833,782 | A | * | 5/1989 | Smith .................... 30/392 |

(Continued)

FOREIGN PATENT DOCUMENTS

EP    1 125 698 A3    8/2001

(Continued)

OTHER PUBLICATIONS

United Kingdom Patent Office Search Report under Section 17(5) for Application No. GB0428353.7 dated Feb. 14, 2005.

*Primary Examiner*—Hwei-Siu C Payer
(74) *Attorney, Agent, or Firm*—McDermott Will & Emery LLP

(57) ABSTRACT

A jigsaw with the functions of blade scrolling and blade pendulum movement comprises a housing, a motor, a reciprocating rod and a motor transmission system. The motor transmission system transfers the rotation of the motor to an up-and-down movement of the reciprocating rod to drive the blade to make an up-and-down cutting operation. The jigsaw still comprises a control device used to control the blade scrolling and the blade pendulum movement and control device comprises a blade button, a set of link rods and a pendulum axis. The rotation of the blade button drives the reciprocating rod to rotate so as to rotate the blade. The pendulum axis is a cam mechanism used to control the rang of the pendulum movement of the blade. The rotation of the pendulum axis will drive the set of link rods so as to control the blade button.

14 Claims, 9 Drawing Sheets

U.S. PATENT DOCUMENTS

| | | |
|---|---|---|
| 5,813,805 A | 9/1998 | Kopras |
| 5,819,421 A * | 10/1998 | Giacometti et al. ........... 30/392 |
| 6,443,675 B1 | 9/2002 | Kopras et al. |
| 6,506,006 B2 | 1/2003 | Lui et al. |
| 6,658,976 B2 | 12/2003 | Dils et al. |
| 2002/0059731 A1 | 5/2002 | Zeiler et al. |
| 2005/0262707 A1* | 12/2005 | Wu ............................ 30/392 |
| 2008/0244916 A1* | 10/2008 | Felder ......................... 30/392 |

FOREIGN PATENT DOCUMENTS

| | | |
|---|---|---|
| GB | 2299539 A | 10/1996 |
| GB | 2 387 808 A | 10/2003 |
| GB | 2414708 A * | 12/2005 |

\* cited by examiner

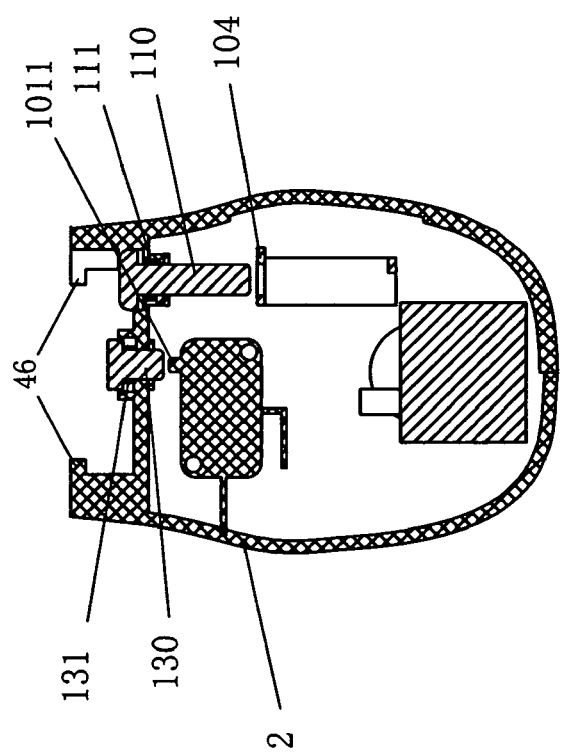
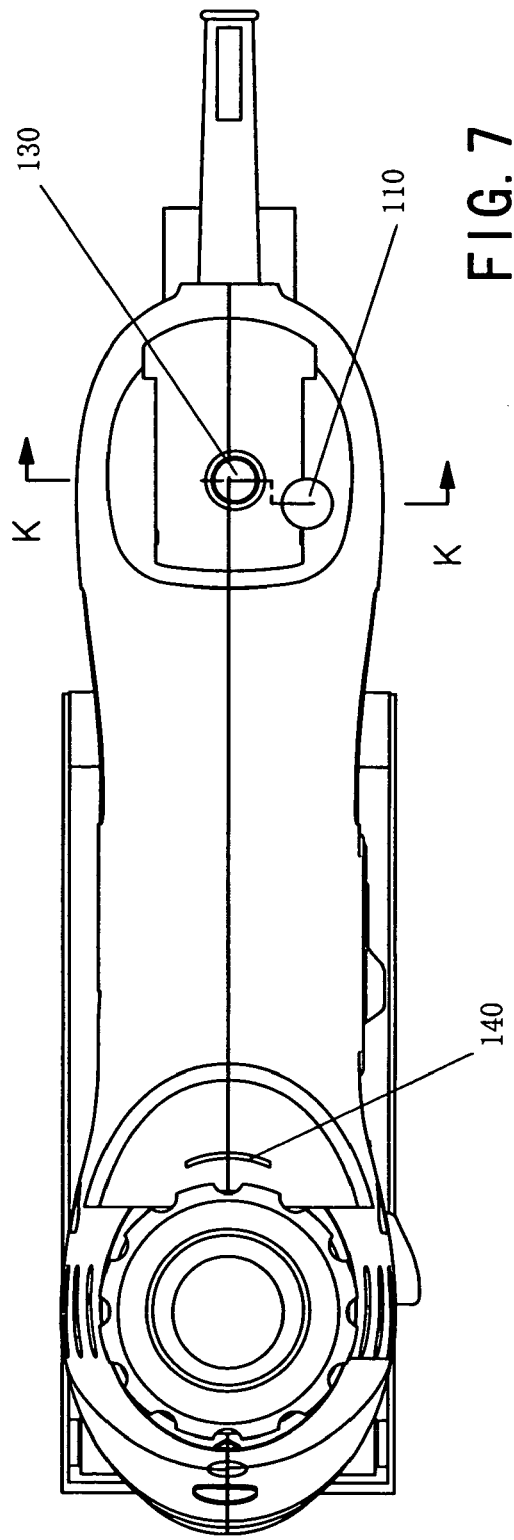
FIG. 8
FIG. 7

HANDHELD POWER TOOL WITH A DETACHABLE HANDLE

CROSS-REFERENCE TO RELATED APPLICATIONS

This application claims the benefit of Chinese Patent Application No. 200420027477.0, filed Jun. 1, 2004 which is incorporated herein by reference.

FEDERALLY SPONSORED RESEARCH OR DEVELOPMENT

Not applicable.

TECHNICAL FIELD

The present invention relates to an improved power tool, and particularly to a reciprocating saw with a detachable handle.

BACKGROUND OF THE INVENTION

A conventional reciprocating saw generally comprises a leading portion perpendicular to the cutting surface, which mainly comprising gear driven means and a reciprocating shaft inside a leading housing, and a motor portion parallel to the cutting surface. A person typically operates a reciprocating saw by grasping the motor housing, or by grasping an extra handle disposed on the motor housing. To maintain a firm grip and precise control, such a reciprocating saw is preferably operated by grasping the motor housing.

However, with extended and continuous operation, the motor housing can become warm, and cutting vibrations may cause an operator's hands and arms to become fatigued. As such, the operating can become uncomfortable, reducing the ability of the operator to precisely control the cut being made. Otherwise, operate a reciprocating saw by grasping a handle is much more comfortable. But when the saw is to be used in tight quarters wherein the handle might become an obstacle to precise control of the cutting tool. When the cutting to be done on the ceiling or some other position which is not horizontal, grasping the motor housing will provide a firm grip and precise control of the cutting.

U.S. Pat. No. 6,443,675 to Kopras et al. discloses a spiral cutting tool with a detachable handle which includes a trigger switch for operating the cutting tool motor. The cutting tool includes a multiple-position power on/off switch mounted on the tool housing. While cutting tools such as those in Kopras et al. address some of the issues described above, there still exist limitations inherent to such systems. For example, the operation of the trigger switch of the device in Kopras et al. depends on three different operating position of the multiple-position power on/off switch. Accordingly, the system is complex, and subject to mechanical malfunctions.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

The present invention provides a power tool, especially a reciprocating saw, with a detachable handle, which can be easily, quickly and securely mounted to the housing and removed therefrom with one hand. Therefore, users can operate the tool with or without the handle optionally.

The reciprocating saw of the present invention comprises a housing which can comprise a leading housing and a motor housing wherein a motor is positioned for driving a gear system, a saw blade, a sole plate and a handle detachably mounted to the housing. The detachable handle preferably has two ends, wherein a lug positioned within the front end and can be inserted into a corresponding aperture of the housing for connecting. The rear end of the handle includes a pair of grooves and a pair of connector each of which comprises a push button and a protruding portion extends under the bottom of the rear end. At the upper portion of the rear end of the motor housing is a connecting platform which comprises a pair of wedging pieces and a pair of key bosses. To mount the handle, a person should guide the wedging pieces in the grooves until the key bosses are matched with the protruding portion.

The reciprocating saw of the present invention also comprises a first switch, a pole, a frame and a first switch trigger for activating the first switch. The reciprocating saw can further comprise a second switch and a trigging pole. The handle comprises a second trigger switch for activating the second switch, a cylindrical shaft fixed in the handle, and a lever pivot through the cylindrical shaft.

The frame mentioned hereinbefore preferably comprises a hole, wherein a locking pole can selectively insert. When the first switch trigger is in its OFF position, the handle can be mounted to the housing. During the mounting of the handle, one of the protruding portions of the connector pushes the locking pole down into the hole of the frame, such that the frame is secured, and the first switch trigger is locked. Conversely, when detaching the handle from the housing, the locking pole escapes from the hole, and the first switch trigger is enabled.

The reciprocating saw of the present invention also comprises a blade clamping device which can be operated without any aid of a tool. The blade clamping device comprises a fixing element, a sleeve, a pair of springs, and a pair of rollers. The fixing element comprises a cavity for receiving the end of a saw blade, a reverse-V-shaped groove and a cylindrical bore on the top of the cavity, and a V-shaped groove through the fixing element for receiving the rollers. The inside of the sleeve has a pair of elongate grooves for receiving and guiding two ends of the rollers.

The reciprocating saw may further comprise a sole plate with a plurality of dust channels. The sole plate includes a base, a sole and a pipe, wherein a groove is positioned in a bottom side of the base. When the sole is mounted to the base, two channels are formed thereby. The dust channels open near the saw blade and connect to the pipe at their respective opposed ends.

According to one aspect of the present invention, the reciprocating saw with detachable handle comprises two switch triggers positioned on the motor housing and the detachable handle respectively for activating the motor.

According to another aspect of the present invention, the reciprocating saw with detachable handle, wherein once the detachable handle is mounted to the housing, the switch trigger on the motor housing will be locked and only the one on the handle is operable. So that the two switch triggers can't be operated simultaneously, and unexpected accident is avoided.

According to another aspect of the present invention, the reciprocating saw with detachable handle comprises a sole plate which includes at least one dust channels which opens near the saw blade and which connect to a pipe at the other end. When in operation, a dust absorption device is connected to the pipe so that sawdust will be absorbed through the dust channels then.

According to still another aspect of the present invention, the reciprocating saw is provided, wherein the saw includes a laser alignment device.

According to yet another aspect of the present invention, the reciprocating saw is provided, wherein the saw includes an illumination system.

According to still another aspect of the present invention a pendulum scrolling reciprocating saw is provided.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 7 is a top view of the reciprocating saw of FIG. 6;

FIG. 8 is a schematic cross-sectional view taken along line K-K in FIG. 7;

DETAILED DESCRIPTION

Figure 1:
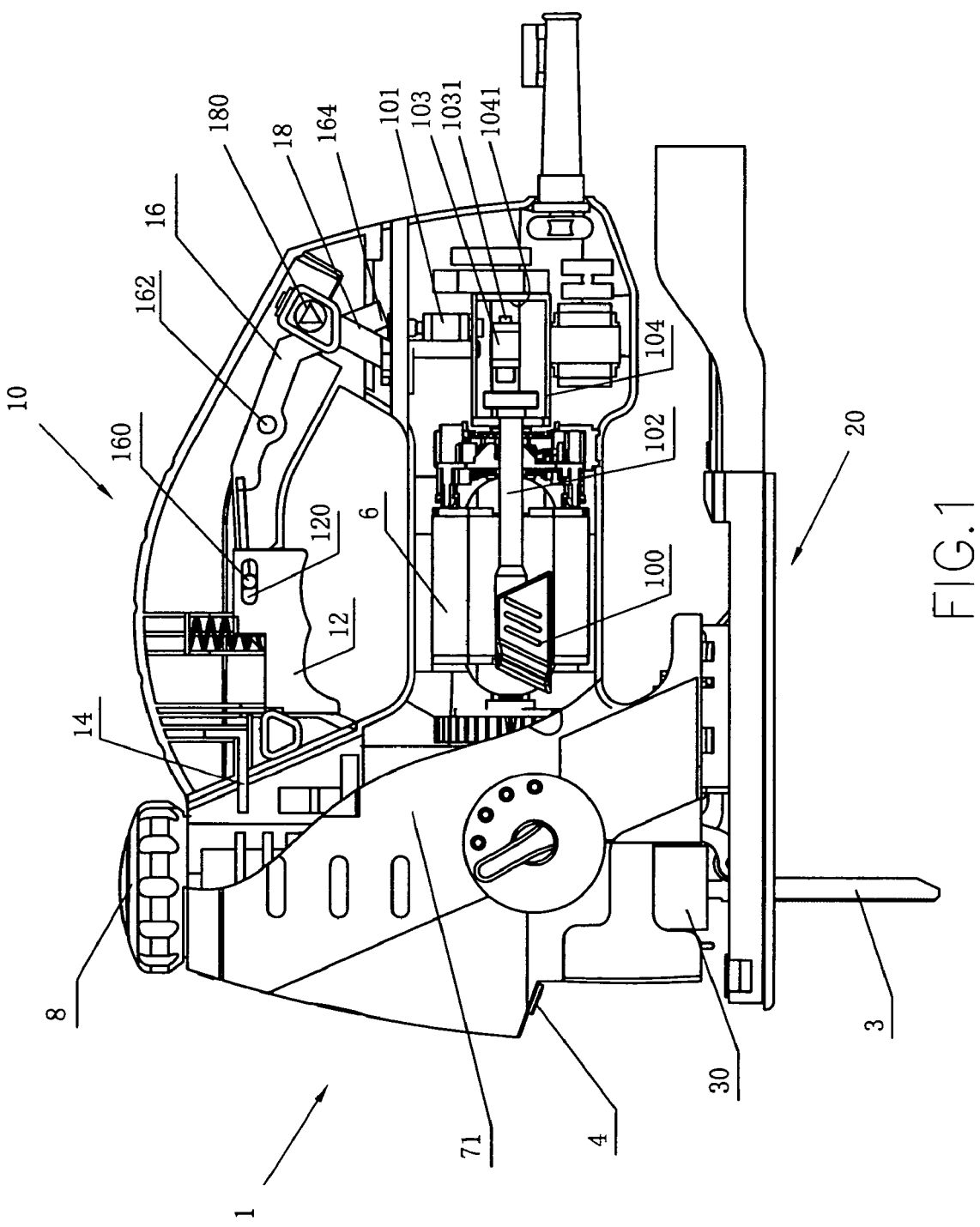
FIG. 1 is a partial cross-sectional front view of a reciprocating saw with the detachable handle mounted on the housing according to the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
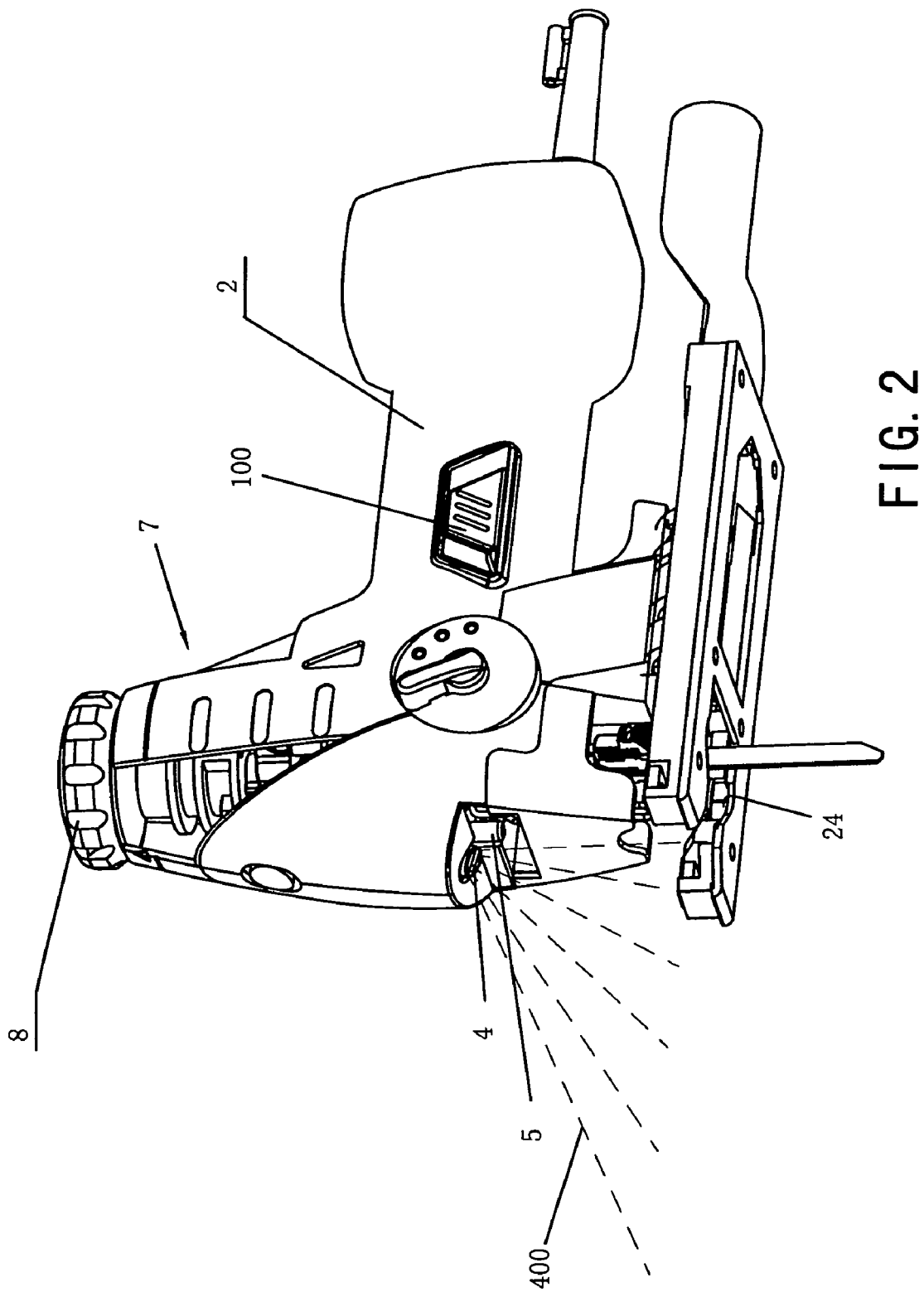
FIG. 2 is a perspective view of a reciprocating saw with the laser alignment device projecting a laser beam according to the present invention.

Referring to FIGS. 1 and 2, a preferred reciprocating saw of the present invention comprises a housing 1. The housing 1 has a leading housing 7, a motor housing 2, a motor 6 and a blade 3. The saw also includes a first switch 103 contained within the motor housing 2. A gear system 71 is positioned within the leading housing 7 for transmitting and altering the rotation of the motor shaft to reciprocation of the blade 3. The saw is also comprised of a detachable handle 10, a laser alignment device 4, an illuminating device 5, a blade clamping means 30, and a sole plate 30.

Figure 4:
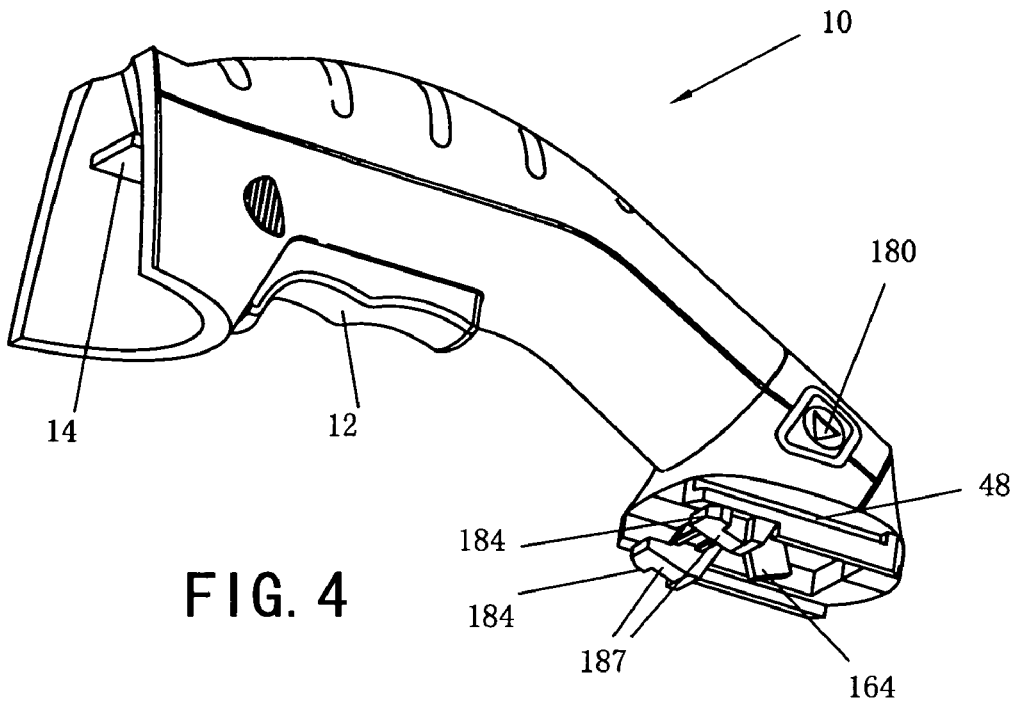
FIG. 4 is a perspective view of a preferred detachable handle according to the present invention.
Figure 5:
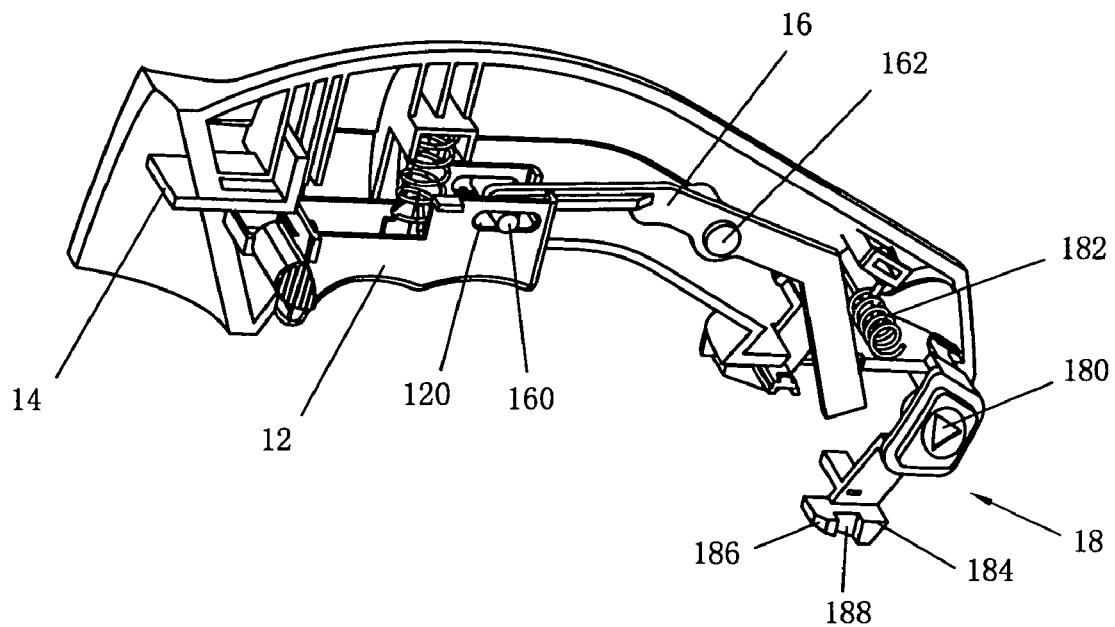
FIG. 5 illustrates the inner structure of the detachable handle according to the present invention.
Figure 6:
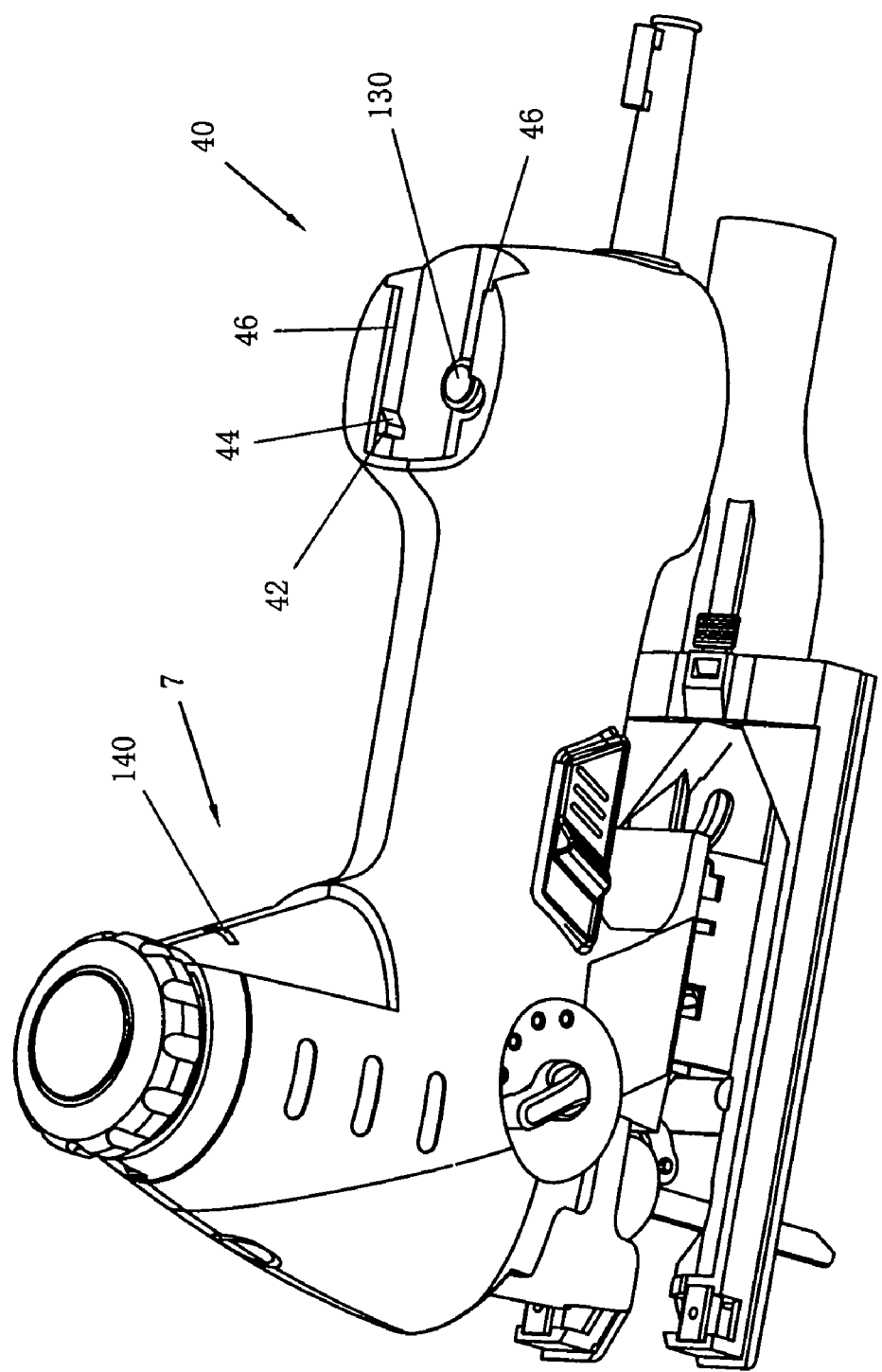
FIG. 6 is a perspective view of a reciprocating saw according to the present invention shown with the handle removed.

Referring to FIG. 4, a lug 14 is positioned within the front end of the handle 10. The lug 14 may be inserted into a corresponding aperture 140 on the housing 1 for connecting as shown in FIG. 6. The rear end of the handle 10 includes a pair of connectors 18 biased away from each other by a spring 182 connected therebetween as shown in FIG. 5. Each connector 18 comprises a push button 180 and a protruding portion 184 which includes a slant 186 and a groove 188 and extends under the bottom of the rear end of the handle 10. The handle 10 further comprises a pair of elongate grooves 48 on the bottom of the rear end. Further referring to FIG. 6, at the rear end of the motor housing 2 is a platform 40 which comprises a pair of opposite wedging pieces 46 and a pair of key bosses 42 each of which comprises a slant 44.

In mounting the handle 10, a user will grasp and push the handle 10 so that the grooves 48 are guided along wedging pieces 46 and the lug 14 is inserted into, and received by, the aperture 140 until the slants 186 of the protruding portions 184 slide over the slants 44 of the key bosses 42 and are locked within the grooves 188. At that time, the lug 14 is thoroughly inserted into the aperture 140, and the handle 10 is fixedly mounted to the housing 1.

To remove the handle 10, a user will first depress the two push buttons 180 of the connectors 18. This will cause the connectors 18 to retract inwards together with the compression of the spring 182. Accordingly, the key bosses 42 disengage from the grooves 188. The user may then pull the handle 10 until the wedging pieces 46 become disengaged from the grooves 48 and the lug 14 is released from the aperture 140.

Referring to FIGS. 1 and 2, the reciprocating saw comprises a first switch 103, a pole 102, a frame 104 and a first switch trigger 100 for activating the first switch 103. When the first switch trigger 100 is moved to a first position as shown in FIG. 2, the triggering surface 1041 of the frame 104 act a force on the trigger 1031 of the first switch 103 and thus the first switch 103 is switched on and the motor 6 is powered. Conversely, moving the first switch trigger 100 to a second position wherein the triggering surface 1041 disengages the trigger 1031, causes the first switch 103 to be shut off and the motor 6 to stop rotating.

It will be appreciated that a second switch trigger 12 operatively positioned on the handle 10 may be provided. This second switch trigger 12 provides for convenient operation of the tool when the handle 10 is attached. The handle 10 further comprises a lever 16 fixed with a roller 160 proximate a front end. The roller 160 is movable within a pair of elongate apertures 120 of the second switch trigger 12. The handle 10 also includes a cylindrical shaft 162 fixed in the handle for pivotally supporting the lever 16.

Figure 3:
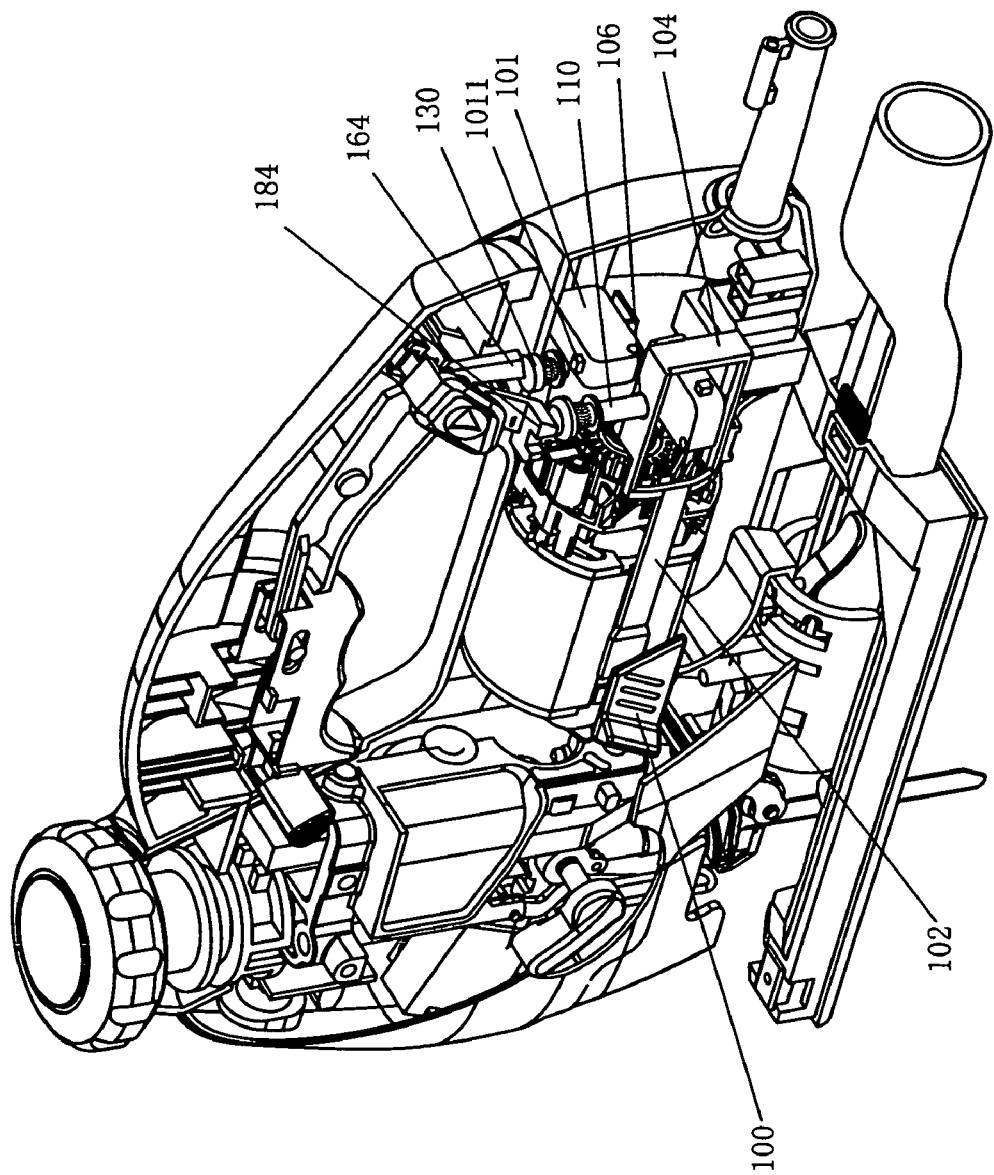
FIG. 3 is a partial cross-sectional perspective view of a reciprocating saw according to the present invention shown with the detachable handle mounted on the housing.

The reciprocating saw may also comprises a second switch 101 as shown in FIG. 3. As shown in FIGS. 7 and 8, the second switch 101 comprises a trigger 1011, above which is disposed a triggering pole 130 disposed with its top end slightly exposed on the platform 40. When the detachable handle 10 is mounted to the tool housing 1 with the second switch trigger 12 on its OFF position, the trailing end 164 of the lever 16 is situated above the top end of the triggering pole 130 leaving the spring 131 free. By depressing the second switch trigger 12, a roller 160 will then be raised, and the lever 16 will pivot clockwise around the cylindrical shaft 162 accordingly. This will cause the trailing end 164 to decline and push the triggering pole 130 to switch the second switch 101 to an ON setting.

In one embodiment of the present invention the reciprocating saw does not include a triggering pole 130. Accordingly, when the second switch trigger 12 is depressed, the trailing end 164 pushes directly on the trigger 1011 of the second switch 101.

Figure 12A:
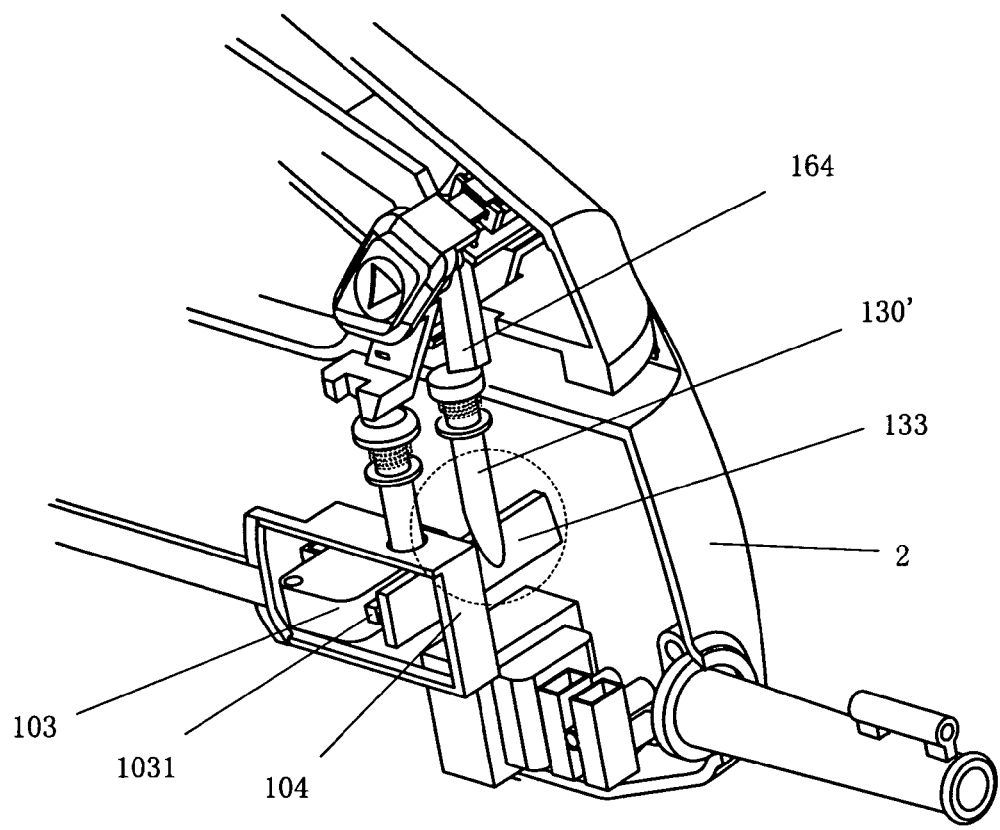
FIG. 12A is a cross-sectional view of a another embodiment of the present invention.
Figure 12B:
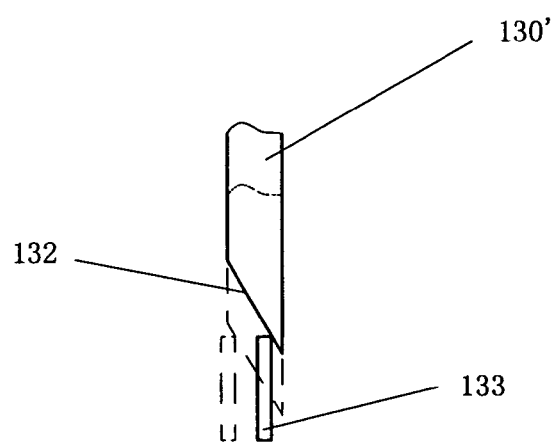
FIG. 12B illustrates two possible positions of the components shown in the dot line circle of FIG. 12A.

It one embodiment of the invention the reciprocating saw does not include the second switch 101. Referring to FIG. 12A, the tool instead further comprises an active pole 130' whose bottom end has a sharp slant 132, and a resilient piece 133 with one end fixed. FIG. 12B is a schematic view showing two relative positions of the active pole 130' and the resilient piece 133. According to this embodiment, the active pole 130' and the resilient piece 133 are in their first position when no force is applied to the active pole 130'. Conversely, when the second switch trigger 12 is pressed, the tailing end 164 of the lever pushes the active pole 130' downwards such that the slant 132 slides on and pushes the resilient piece 133 to its second position (illustrated in phantom), wherein the trigger 1031 is pushed by the resilient piece 133 and thus the switch 103 is triggered to an ON position. If, however, the handle 10 is not attached, when the first switch trigger 100 is depressed, the frame 104 will follow to push the resilient piece 133 and activate the switch.

To avoid multiple operations of the two switch triggers, and thus prevent unexpected accidents, the reciprocating saw preferably has a function, wherein when the handle 10 is attached to the housing 1, the first switch trigger 100 on the motor housing 2 will be locked in its OFF position and only the second switch trigger 12 on the handle 10 is operable. As shown in FIG. 3, to achieve such an object, the frame 104 preferably comprises a hole 106 in which a locking pole 110 may be selectively inserted.

When the handle 10 is not mounted on the tool, a spring 111 remains free, and the locking pole 110 is released above the hole 106 as shown in FIG. 8, and the frame 104 can be moved freely to switch ON or OFF the motor 6. When the first switch trigger 100 is in its OFF position, the handle 10, may be mounted to the housing 1. As illustrated in FIGS. 1 and 3, During the mounting of the handle 10 a bottom slant 187 of one of the protruding portions 184 pushes the locking pole 110 down into the hole 106 such that the frame 104 is hold from moving, and the first switch trigger 100 is locked in its OFF position. Conversely, when the handle 10 is detached from the housing 1, the locking pole 110 escapes from the hole 106, and the first switch trigger 100 is enabled.

Figure 9:
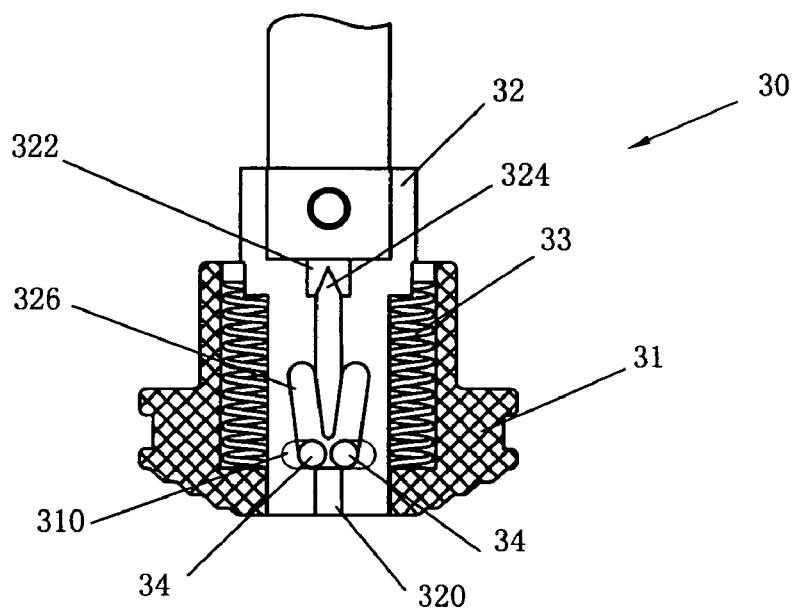
FIG. 9 is a front sectional view of a preferred blade clamping device according to the present invention.
Figure 10:
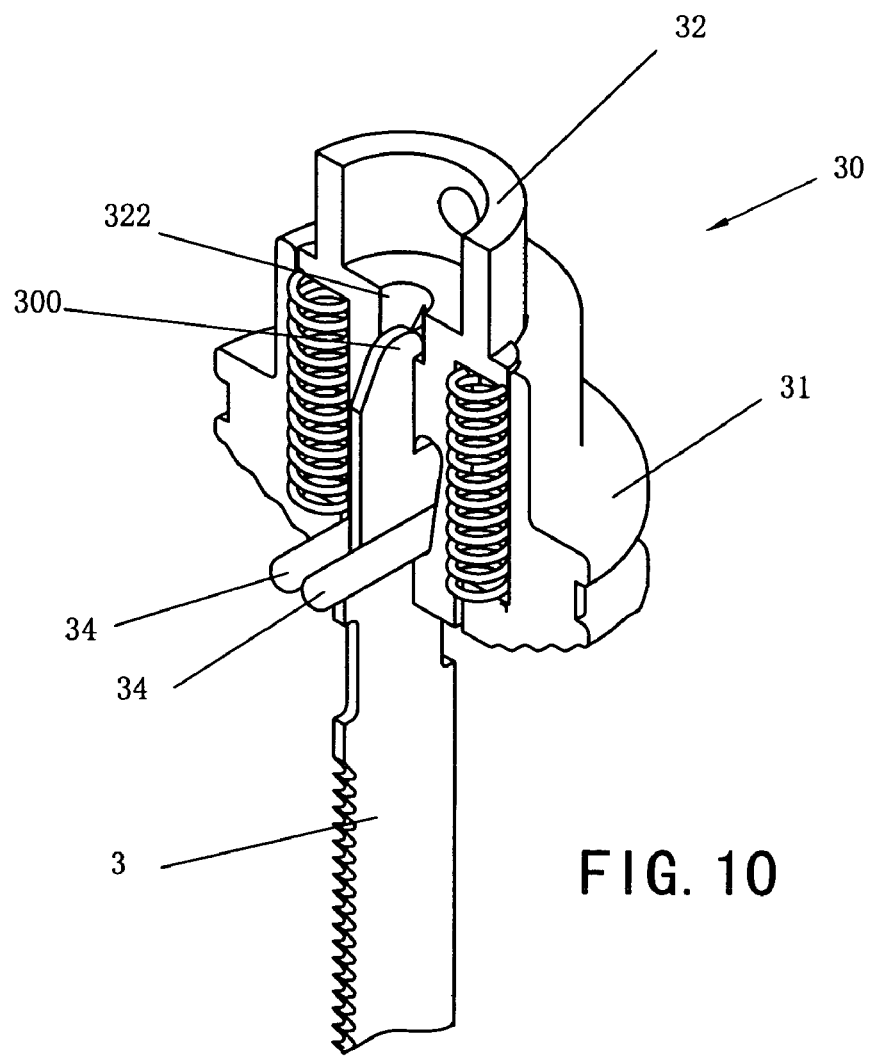
FIG. 10 is a perspective view of the blade clamping device of FIG. 9 shown with a blade.

In one embodiment, the reciprocating saw of the present invention preferably comprises a blade clamping device 30 which can be operated without the aid of a tool. Referring to FIG. 9 and FIG. 10, the blade clamping device comprises a fixing element 32, a sleeve 31, a pair of springs 33 and a pair of rollers 34. The fixing element 32 comprises a cavity 320 for receiving an end of the saw blade 3, a reverse-V-shaped groove 324 and a cylindrical bore 322 on the top of the cavity 320 such that the top end 300 of the blade 3 can be fixedly received. The blade clamping device 30 further comprises a V-shaped groove 326 through the fixing element 32 for receiving the rollers 34 therein. The sleeve 31 includes a pair of elongate grooves 310 for receiving and guiding two ends of the rollers 34.

The blade clamping device 30 shown in FIG. 9 is free for receiving a blade. To clamp a blade, a user pushes the sleeve 31 upwards causing the roller 34 to run aslant along the V-shaped groove 326. The blade 3 is then inserted through the gap of the two rollers 34 until the top end 300 reaches and is received in the cylindrical bore 322. The sleeve 31 is then released. Under the biasing force of the springs 33, the sleeve 31 will run down together with the roller 34 therein. The rollers 34 slide along the slant of the V-shaped groove 326 towards the blade 3, and apply a force to the blade 3 thereby to fixedly clamping the blade 3.

Figure 11A:
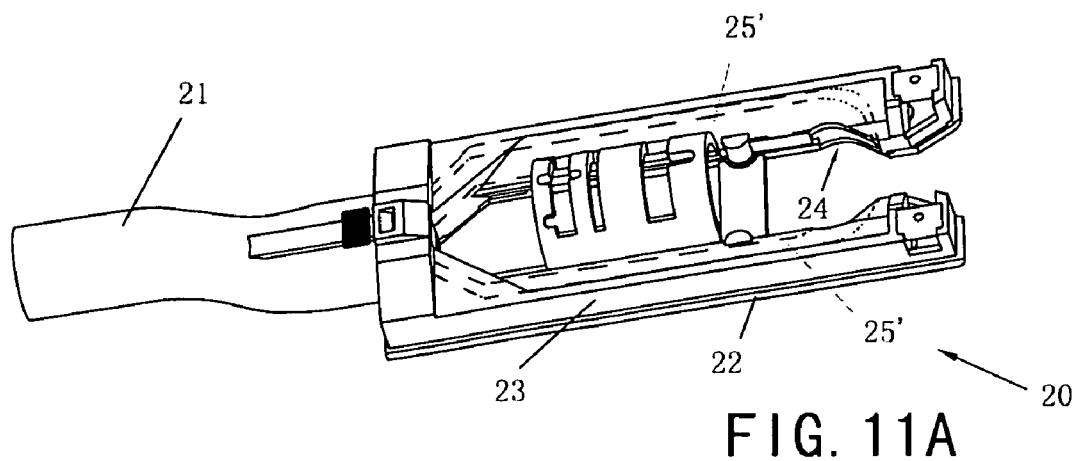
FIG. 11A is a perspective view of a sole plate according to the present invention.
Figure 11B:
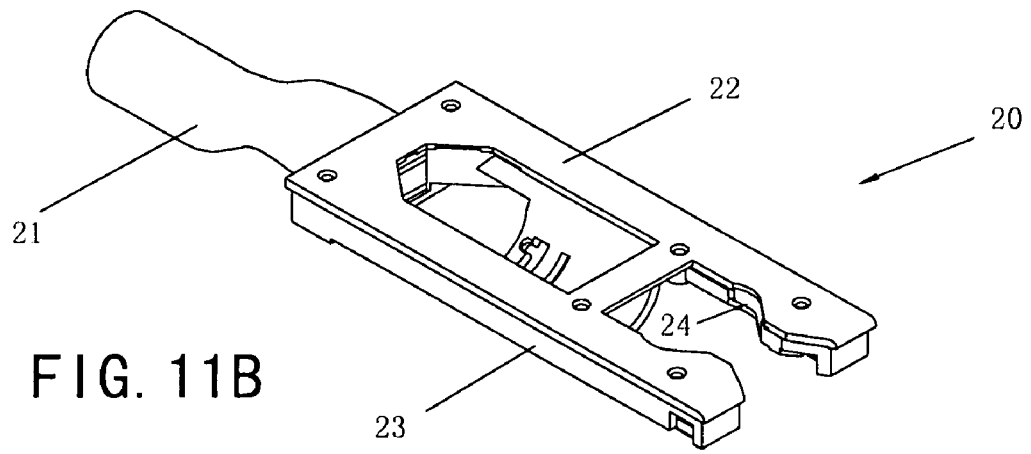
FIG. 11B is another perspective view of a sole plate according to the present invention.
Figure 11C:
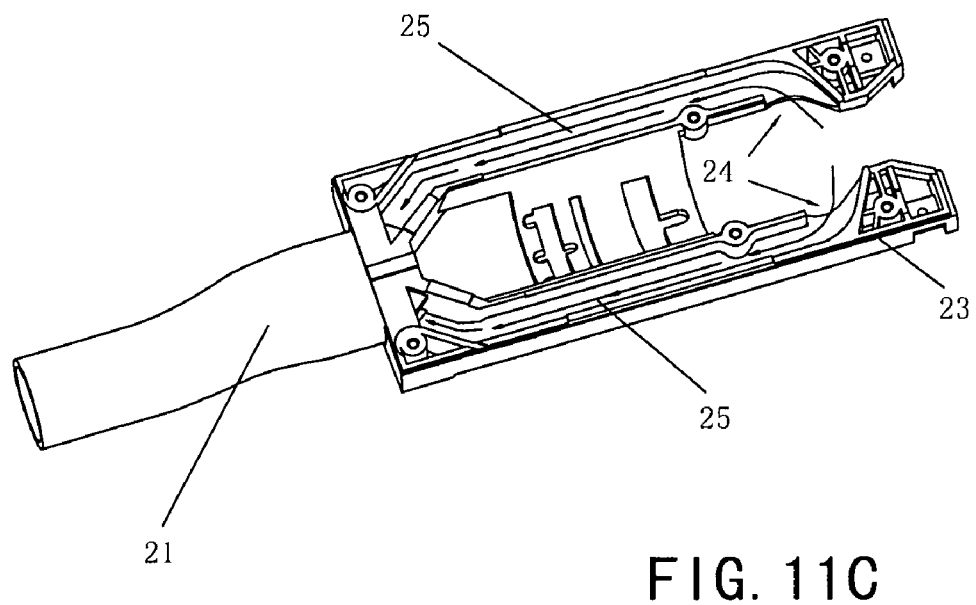
FIG. 11C is a another perspective view of a sole plate according to the present invention.

In one embodiment of the present invention, the reciprocating saw further comprises a sole plate 20 with a pair of dust channels 25'. Referring to FIGS. 11A-11C, the sole plate 20 includes a base 23, a sole 22 and a pipe 21, wherein a pair of groove 25 is positioned on the bottom side of the base 23. When the sole plate 22 is mounted to the base 23, two channels 25' are formed thereby. Each of the dust channels 25' has at least one opening 24 disposed proximate the saw blade 3. By connecting a dust collector to the pipe 21, the sawdust may be absorbed along the channels 25' into the dust collector.

According to one embodiment of the present invention shown in FIG. 2, the reciprocating saw comprises an illumination system 5 to illuminate the cutting area. The reciprocating saw may also include a laser alignment device 4 to project a fan-shaped laser beam 400 which can reflect a visible line on the work piece as a cutting reference, referring to FIG. 2. For example the alignment device 4 may be of the type described in China Patent No. ZL02220128.9.

According to the present invention, it is preferable that the reciprocating saw include a saw blade capable of scrolling and pendular movement as described in China Application No. 200420024532.0 which is hereby incorporated by reference.

When in practice use, a user can grasp the knob 8 with one hand and held the motor housing 2 with the other hand. Alternatively, the user can also mount the handle 10 to the housing 1 and operate with one hand held on the handle.

While the invention has been described in the specification and illustrated in the drawings with reference to preferred embodiments, it will be understood by those skilled in the art that various changes may be made and equivalents may be substituted for elements thereof without departing from the scope of the invention as defined in the claims. Accordingly, it is intended that the invention not be limited to the particular embodiment illustrated by the drawings and described in the specification as the best mode presently contemplated for carrying out this invention, but that the invention will include any embodiments falling within the scope of the accompanying Claims.

What is claimed is:

1. A reciprocating saw, comprising:
a leading housing;
a gear system disposed within the leading housing;
a motor housing having a motor disposed therein;
a first switch trigger disposed on the motor housing, the first switch trigger movable between a first position and a second position for activating a first switch between an on position and an off position within the motor housing;
a saw blade connected to the gear system for reciprocating movement;
a sole plate which has a bottom surface; and
a separate handle detachably mounted to at least one of the leading housing and the motor housing;
a second switch trigger disposed on the handle and being operable to control operation of the motor when the handle is mounted to the at least one of the leading housing and the motor housing;
wherein a first distance defined between the motor housing and the sole plate is less than a second distance defined between the handle and the sole plate, wherein at least a portion of the handle is disposed directly above the motor housing; and, wherein the first switch trigger cannot actuate the first switch when the handle is mounted to the at least one of the leading housing and the motor housing.

2. A reciprocating saw of claim 1, wherein the handle comprises a pair of connectors, each connector comprising a protruding portion extending therebelow for slidable engagement with a pair of key bosses incorporated on the motor housing.

3. A reciprocating saw of claim 2, wherein the handle further comprises a lever which operably interconnects the first switch trigger and the second switch trigger.

4. A reciprocating saw of claim 2, wherein the motor housing further contains a second switch, and the handle further comprises a lever, the lever being operably connected to the second switch trigger, and being provided for activating the second switch.

5. A reciprocating saw of claim 2, wherein said motor housing further includes a frame, the frame comprising a hole provided for selectively receiving a locking pole.

6. A reciprocating saw of claim 5, wherein the protruding portion of the connector is configured to engage the locking pole, the protruding portion being provided for pushing the locking pole into the hole.

7. A reciprocating saw of claim 6, further comprising means for scrolling the saw blade.

8. A reciprocating saw of claim 6, further comprising means for oscillating the saw blade.

9. A reciprocating saw of claim 1, wherein the first switch trigger is locked when the handle is attached to the motor housing.

10. A reciprocating saw of claim 9, further comprising an illumination system.

11. A reciprocating saw of claim 9, further comprising a laser alignment device.

12. A reciprocating saw of claim 1, further comprising a blade clamping device, the clamping device provided for tool-less fixation of a saw blade.

13. A reciprocating saw of claim 1, wherein said sole plate has at least one dust channel, the at least one dust channel having at least one opening disposed proximate the saw blade.

14. A reciprocating saw of claim 1, wherein the motor housing has a longitudinal axis extending substantially parallel to the bottom surface of the sole plate.

* * * * *